(12) United States Patent
Armas

(10) Patent No.: US 10,533,301 B1
(45) Date of Patent: Jan. 14, 2020

(54) GPS AND LASER GRADING CONTROL

(71) Applicant: David Armas, Florida City, FL (US)

(72) Inventor: David Armas, Florida City, FL (US)

( * ) Notice: Subject to any disclaimer, the term of this patent is extended or adjusted under 35 U.S.C. 154(b) by 0 days.

(21) Appl. No.: 16/228,653

(22) Filed: Dec. 20, 2018

(51) Int. Cl.
| | |
|---|---|
| *E02F 3/04* | (2006.01) |
| *E02F 3/84* | (2006.01) |
| *G05D 1/02* | (2006.01) |
| *E02F 3/76* | (2006.01) |

(52) U.S. Cl.
CPC ............ *E02F 3/844* (2013.01); *E02F 3/7609* (2013.01); *G05D 1/0278* (2013.01); *E02F 3/847* (2013.01)

(58) Field of Classification Search
CPC .................................. E02F 3/844; E02F 3/847
USPC ............... 172/4.5, 779, 812, 819 Q
See application file for complete search history.

(56) References Cited

U.S. PATENT DOCUMENTS

| | | | | |
|---|---|---|---|---|
| 8,352,132 | B2 * | 1/2013 | Omelchenko | E02F 3/842 172/4.5 |
| 8,596,373 | B2 * | 12/2013 | Montgomery | E02F 3/847 172/2 |
| 8,634,991 | B2 * | 1/2014 | Douglas | E02F 3/847 172/4.5 |
| 9,085,877 | B2 * | 7/2015 | Wahlmark | E02F 3/764 |
| 9,234,329 | B2 * | 1/2016 | Jaliwala | E02F 9/2041 |
| 9,435,101 | B2 * | 9/2016 | Zhdanov | E02F 3/844 |
| 9,624,643 | B2 * | 4/2017 | Hendron | E02F 3/847 |
| 9,903,096 | B2 * | 2/2018 | Noborio | G01S 19/49 |
| 9,938,689 | B2 * | 4/2018 | Chaston | E02F 3/844 |
| 2008/0087447 | A1 * | 4/2008 | Piekutowski | E02F 3/845 172/3 |
| 2010/0023228 | A1 * | 1/2010 | Montgomery | E02F 3/845 701/50 |
| 2012/0059554 | A1 * | 3/2012 | Omelchenko | E02F 3/845 701/50 |
| 2013/0158814 | A1 * | 6/2013 | Evenson | E02F 9/2296 701/50 |

* cited by examiner

*Primary Examiner* — Gary S Hartmann
(74) *Attorney, Agent, or Firm* — Christopher J. VanDam, PA; Christopher VanDam

(57) ABSTRACT

A hydraulic control system for an earth-moving vehicle with an automatic grade control system that hydraulically powers the height of the blade through the hydraulic accessory port. When using a laser based system the main arms are controlled through the accessory port and a pitch movement of the blade is limited. When using a GPS based system the accessory hydraulic is disconnected from the main arm and reconnected to the pitch hydraulic to affect the height of the blade.

2 Claims, 6 Drawing Sheets

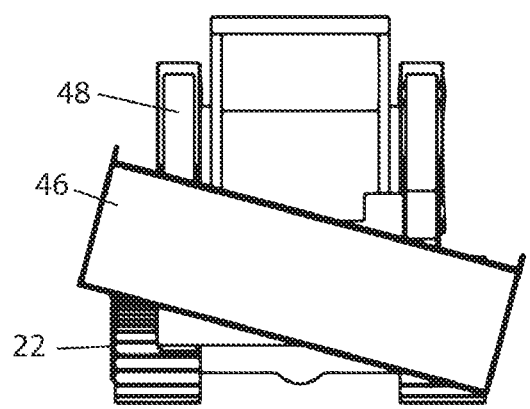
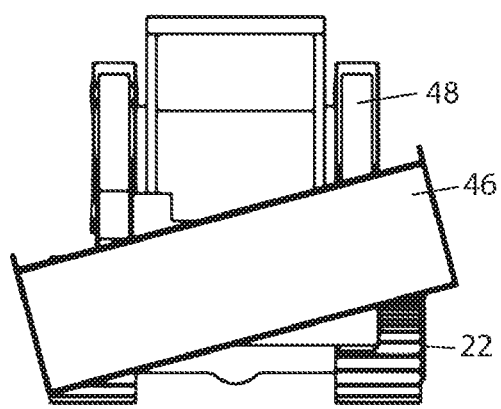
FIG. 3    FIG. 4
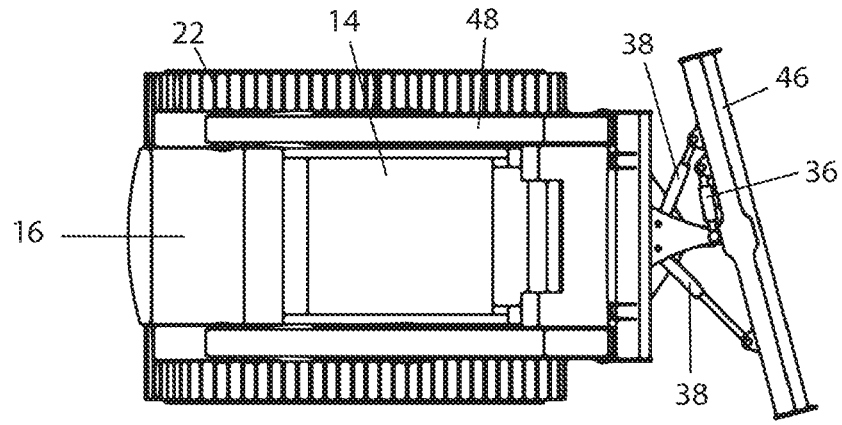
FIG. 5
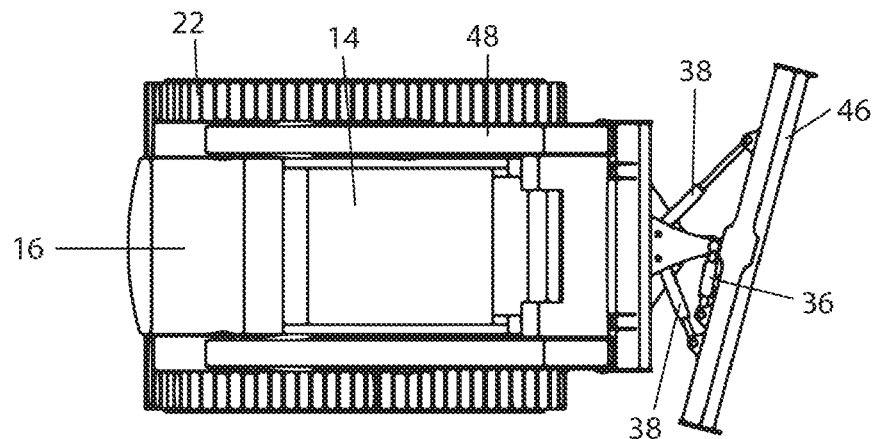
FIG. 6

GPS AND LASER GRADING CONTROL

BACKGROUND OF THE INVENTION

1. Field of the Invention

The present invention relates to earth moving equipment, and more particularly, to an improved earth moving grader stabilizer.

2. Description of the Related Art

Several designs for improvements to earth moving equipment have been designed in the past. None of them, however, includes a device that stabilizes an earth moving grader blade of small to medium-sized track-steer or skid-steer vehicles using a remote grade controller system.

Applicant believes that the closest reference corresponds to U.S. patent application Ser. No. 16/055,094 filed on 4 Aug. 2018 by common inventor Armas. However, it differs from the present invention because the '094 Armas method stabilizes the dozer blade by stopping the main arm in its lift axis movements of the dozer blade by lowering the main arm of the vehicle into so the dozer blade is at the proper height and then controlling the blade cut height with automatic GPS controls moving the pitch axis of the attachment. While this method works exceptionally well with a GPS automatic grade control system, it lack the ability to rapidly convert the machine back into being controlled by automatic laser grade control system.

The limitations of this method rests in the requirement for the automatic grading system to finely adjust the grade height of the blade by using the large hydraulics of the main arm to lift and lower the entire dozer blade assembly along with the up and down movements of the main arm. This creates a lot of weight being moved continually up and down as the blade automatically is adjusted by the automatic grade system which has the limitations of using significant power, imparting stress on the greater structure of the skid steer vehicle, slows movement with greater mass being moved and reduces the fineness of the resolution that the cutting edge of the blade can be held during automatic grading operations.

The Armas system is very effective when used with an automatic laser grading systems as disclosed in his '111 patent. The laser system is guided by a laser receiver mast affixed to the dozer blade to measure and calibrate the controlled movements of the vertical position of the dozer blade during automatic grading operations. For this to be effective the blade must generally be held vertically to ensure that the laser mast is generally vertical. Tilting of the mast off from a vertical position would impart an error to the system causing the automatic controller to misinterpret the actual height of the bottom of the dozer blade relative to the earth being moved.

However, with the advent of higher resolutions with the wide area augmentation system global positioning system (WAAS-GPS) the laser mast is no longer required in all automatic grading systems. The limitation created by a tilting mast that can confuse the accuracy of a laser grading system is no longer a factor for these systems. The location of the blade can be derived by satellite and the height of the blade calibrated for consistent and accurate automatic grading.

The present device and method enhances several stabilizers for dozer blade attachments by allowing easy and rapid conversion of the automatic control modes from limiting the main arm of the vehicle axis of movement for GPS grading to that of the pitch axis hydraulics for laser grading. This provides a stable platform for the dozer blade attachment assembly that in turn which permits greater control of the blade and stabilizes the blade for more precise control in the particular role in which the machine is then being utilized. This and other features are described in more detail below and in the accompanying drawings.

Other patents describing the closest subject matter provide for a number of more or less complicated features that fail to solve the problem in an efficient and economical way. None of these patents suggest the novel features of the present invention.

A brief abstract of the technical disclosure in the specification and title are provided as well for the purposes of complying with 37 CFR 1.72 and are not intended to be used for interpreting or limiting the scope of the claims.

Without limiting the scope of the invention, a brief summary of some of the claimed embodiments of the invention is set forth below. Additional details of the summarized embodiments of the invention and/or additional embodiments of the invention may be found in the detailed description of the invention below.

SUMMARY OF THE INVENTION

It is one of the main objects of the present invention to provide a device that grades a wide variety of soil types and site conditions in a highly accurate way with either a GPS or laser grading automatic control system.

Another object of the present invention is to provide a stable platform on a medium to small skid steer vehicle that can rapidly switch between the use of automatic laser grading with mast affixed to the dozer blade and also rapidly adapts the vehicle to be suitable for GPS automatic laser grading systems.

It is another object of the present invention that does not require any material modification to the skid steer vehicle native hydraulic system or addition of further hydraulic control valves integrated with either automatic control systems. The substantive changes are instead made on the dozer blade attachment.

It is another object of this invention to provide a device that can maneuver in restricted space and around sensitive objects and substrates.

It is still another object of the present invention to provide greater functionality to small to medium skid steer and track steer vehicles while retaining their ability to be used with the wide variety of available accessories.

It is yet another object of this invention to provide such a device that is inexpensive to manufacture, light weight and easy to maintain while retaining its effectiveness.

Further objects of the invention will be brought out in the following part of the specification, wherein detailed description is for the purpose of fully disclosing the invention without placing limitations thereon.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 3 is a front elevation view demonstrating blade roll counter clockwise.

FIG. 4 is a front elevation view demonstrating blade roll clockwise.

FIG. 5 is a top plan view demonstrating blade yaw left.

FIG. 6 is a top plan view demonstrating blade yaw right.

DETAILED DESCRIPTION OF THE PREFERRED EMBODIMENT

Figure 1:
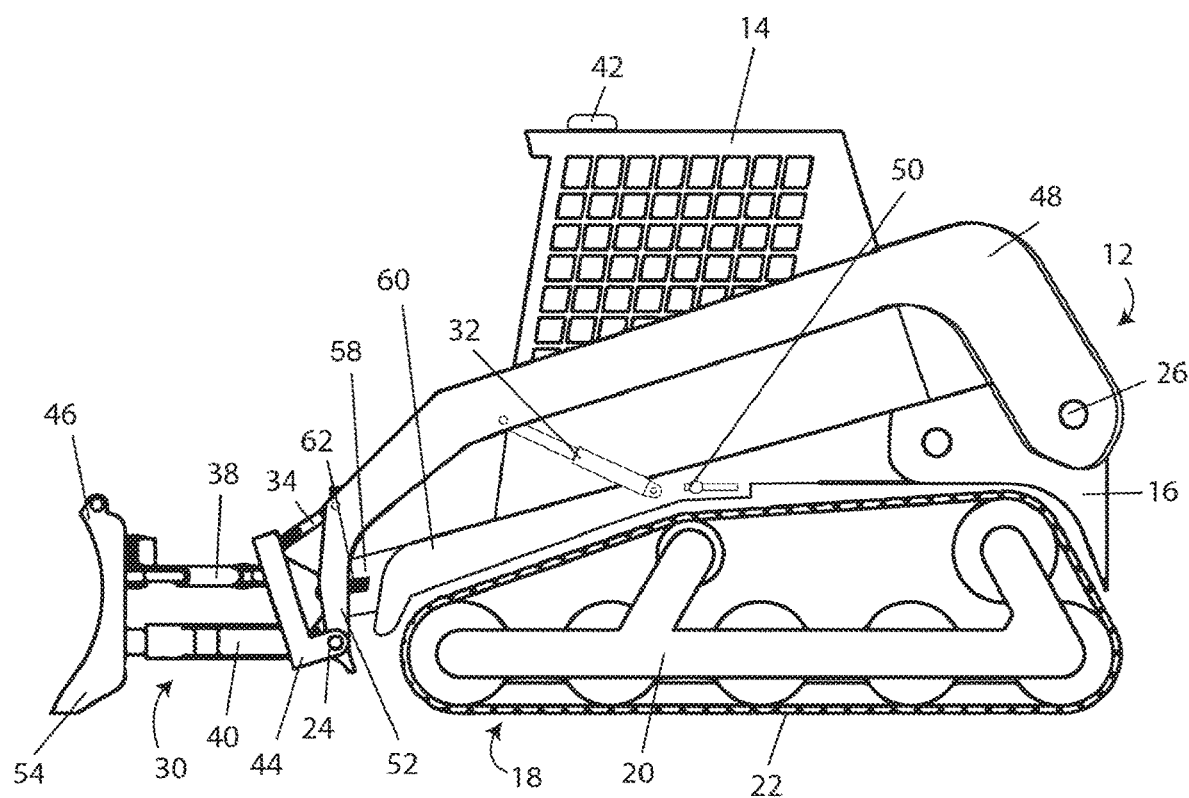
FIG. 1 is a side elevation view of a track steer vehicle with a dozer blade in a lower position.

While this invention may be embodied in many different forms, there are described in detail herein specific embodiments of the invention. This description is an exemplary of the principles of the invention and is not intended to limit the invention to the particular embodiments illustrated and described.

For the purpose of this disclosure, like reference numerals in the figures shall refer to like features unless otherwise indicated or is obvious by context.

The subject device and method of use is sometimes referred to as the device, the invention, the dozer, the automatic grader, the skid steer, the bracket, the GPS grader, the laser grader, the bulldozer, the machine, the system, the method or other similar terms. These terms may be used interchangeably as context requires and from use the intent becomes apparent. The masculine can sometimes refer to the feminine and neuter and vice versa. The plural may include the singular and singular the plural as appropriate from a fair and reasonable interpretation in the situation and context.

Skid steer vehicles are commonly commercially available. The skid steer vehicle that is preferred to work with the present device is small to medium sized and designed to accept any of a variety of front end accessories such as a dozer blade, pallet forks, a mower, a hole digger and several others. These front end accessories can be interchanged relatively easy with one or two men in a few minutes. The popularity of the small to medium sized skid steer class of vehicle is owed largely to the availability of the front end accessories by allowing a single vehicle to accomplish a wide variety of tasks without the need for specialty vehicles.

Grade control systems, such as laser automation, are commonly commercially available. Many early systems worked with a laser reference beacon erected on an edge of a job site at a known location and elevation established by survey. A laser receiver is attached to earth-moving equipment, typically onto the ground contacting blade, and sends a signal to a computer accessible to the operator of the earth-moving equipment. The computer is able to determine if the blade is above or below the desired grade and make adjustments as necessary to the blade height by controlling the hydraulics that move the blade.

More recently, the automatic grade control systems have evolved to include highly accurate GPS signals in combination with computer control modules to automate the height of the dozer blade as the vehicle moves over the job site. Laser control masts are no longer required to maintain the accuracy of earlier machines for many grading situations, particularly where open access to the sky is available for clearly receiving the GPS satellite signals.

With the most laser control systems, the dozer blade supported the laser control receiver mast. This mast must be held upright, nearly vertical, consistently so that the system could use the top of the mast as a datum for referencing the height of the bottom of the dozer blade the defined the grade being made as the dozer moved over the earth defining the new grade.

Prior art solutions kept the blade and therefore the laser mast vertical by preventing the pitch axis of movement of the dozer blade by including wheels in front of the dozer blade. This kept the mast vertical. However, the cumbersome wheels made many fine grading tasks difficult, if not impossible.

The dozer blade assembly with the several hydraulic actuators, dozer blade, hoses, frame and other elements, along with the main arm itself is very heavy. This uses substantial energy to move and has a potential for slowed and jerky movements that can affect the precision and smoothness of the grade. For both laser and GPS automatic grading operations the blade must be smoothed out for use in all but the shallowest, smoothest and finest substrates.

Laser grading systems still remain important for some grading applications. In some situations a GPS signal is not available. For grading inside a building, under a tree canopy, inside a tunnel, cavern or near steep cliffs there may be inadequate GPS signal for a high resolution automatic grade solution.

In other cases legacy laser systems are available and installed on grading machines that remain in serviceable condition. Some owners and operators are more adept at and confident with laser grading control systems and prefer to keep those systems in operation.

Some operators want the ability to switch between laser system with one blade or grade front end attachment and also be able to switch to using a GPS based system with the same front end attachment or a dedicated dozer blade attachment. Each system, laser and GPS, has its own advantages in certain applications.

GPS has more recently been employed to control the automatic grade computer location and the required grade relative to that location. Without the laser mast the dozer blade, previously restricted in pitch movement, can now be freed to adjust as necessary to control the bottom of the dozer blade defining the surface grade.

However, it has been determined through much trouble and experimentation that when the main arm is available to control the height of the bottom of the dozer blade while the pitch axis of the blade is simultaneously adjusting the height of the bottom of the blade that a consistent grade cannot be consistently achieved. This is particularly so when there are varying densities of soil substrates that are being graded with the dozer blade. In other words, the problem arises when both the blade pitch hydraulic and the main arm hydraulic are both active and not able to move in that the dozer blade is unstable during automatic grading operations.

A solution at the heart of the present invention is to secure the height of the main arm during GPS or laser controlled automatic grading so that when the dozer blade is moved, the bottom of the dozer blade is at a precisely controlled height relative to the preexisting grade as generally defined as the plane on which the dozer tracks ride.

With the advent of highly accurate GPS and related positioning systems the laser reference is no longer needed to be affixed to the top of the blade. This now allows the pitch axis, or forward tilt of the dozer blade to be moved without adversely affecting a laser control system and thereby freeing earlier limitations. This is generally not possible when using laser controlled grading because the mast controlling the height of the blade must be kept vertical to accurately read the signal coming from the nearby laser datum beacon.

Yet, when laser grading systems are employed on the same grading machine the vertical blade should be maintained and the height of the blade be controlled with the main arms and not with the pitch hydraulic movement. A grading device that can in GPS grading mode control the height of the blade with the pitch axis hydraulics while keeping the main arm fixed that can also be in a laser grading mode with the height of the blade controlled by the main arms while the pitch axis hydraulics are constrained and limited in movement has great benefit.

Figure 9:
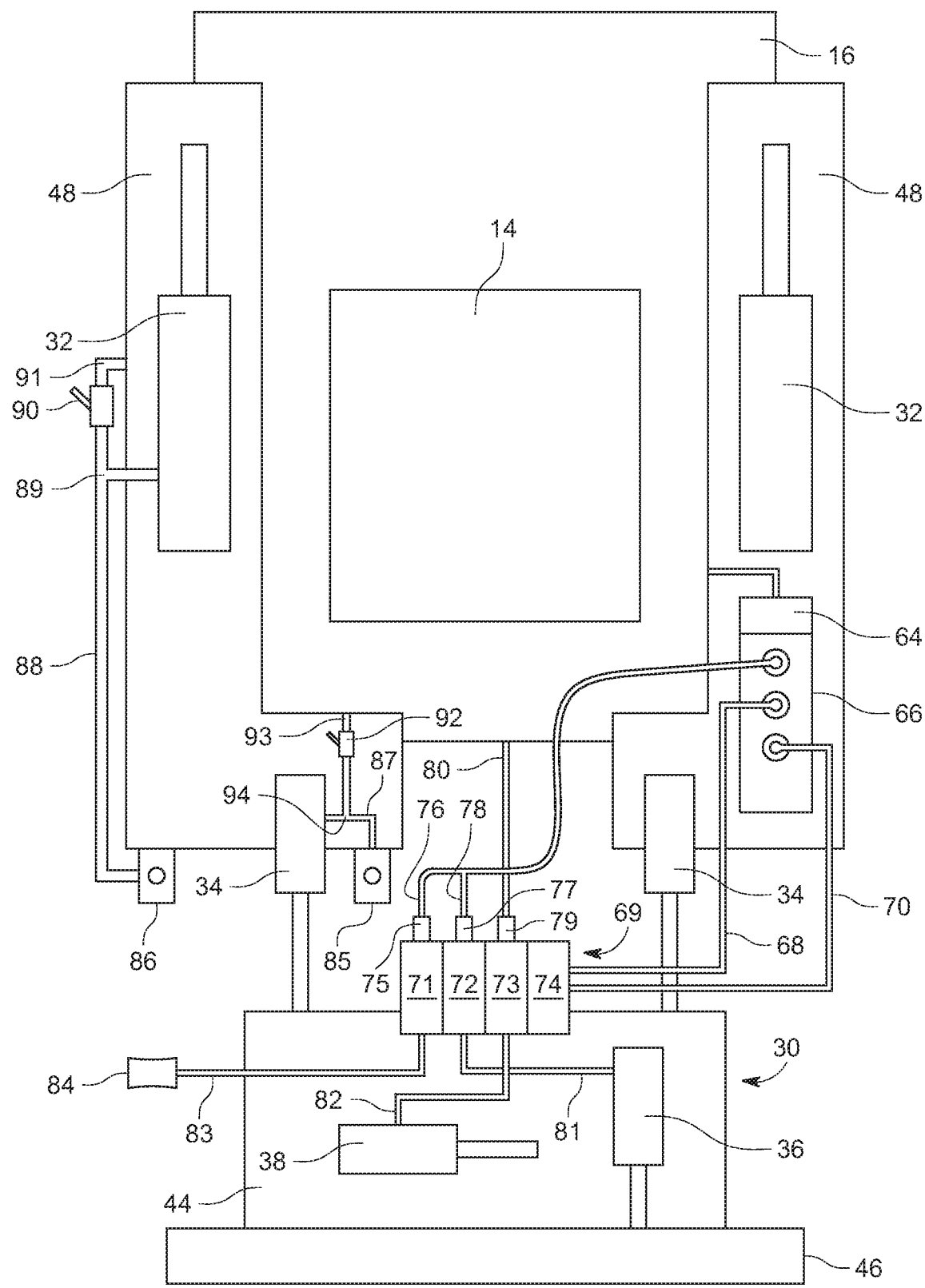
FIG. 9 is a top plan view of a stylized bulldozer vehicle with a three valve assembly on the attachment assembly.

Looking at the FIG. 9 in the drawings a plan view stylized schematic top side plan view of a bulldozer layout that includes features in earlier figures and additionally shows an electronic controller 64, an interface 66, a supply 68, a valve assembly 69, a return 70, a valve 71, a valve 72, a valve 73, a manifold 74, a solenoid 75, a cable 76, a solenoid 77, a cable 78, a solenoid 79, a cable 80, a line 81, a line 82, a line 83, a connector 84, a port 85, a port 86, a line 87, a line 88, a tee 89, a valve 90, line 91, valve 92 and line 93.

The tractor assembly 12 is supplied by the manufacturer of the tractor with substantially all of the original and necessary part. The dozer blade assembly 30 is an aftermarket product provided by a third part manufacturer and is generally not always supplied with the tractor assembly 12 when new. A wide variety of front end attachments, of which the dozer blade assembly is but one, are available to be operatively attached to the front of the tractor assembly 12.

The limited modifications to the tractor assembly 12 include, for example, a laser controller computer system in the cab 14 that has a connection interface 66 that serves as a series of plugs or ports at which location the attachment, such as the dozer blade assembly 30, may connect to the electronic and hydraulic controls that are part of the skid steer vehicle.

The tractor assembly 12 may also have modifications including adding a tee 89 valve into the hydraulic control lines 88 of the main arms 48. It should be noted that although FIG. 9 only shows one side of the hydraulic lines 88 and other controls that there is an equal and similarly functioning system on the other side of the vehicle that was omitted from the drawings for sake of clarity.

The tee 89 allows hydraulic pressured supply and return to be delivered to the hydraulic actuator 32 responsible for operating the main arm 48 from the original lines coming from the native hydraulic pump supplied originally with the machine or to be supplied with hydraulic pressure and return supplied through port 86, through hydraulic line 88 to the hydraulic actuator 32.

A valve 90 is optionally supplied between the tee 89 and line 91 from the native hydraulic pump to disconnect the native pump from the hydraulic actuator 32 when that hydraulic actuator 32 is powered by the alternate hydraulic source through port 86 and line 88. Generally, this valve 90 will be closed when the GPS automatic system is in use. While the laser control system (as opposed the GPS based system) is in use the pitch hydraulic actuator 34 is immobilized and the hydraulic supply and return that would control hydraulic actuator 34 is diverted into port 86 to control the main arm 48 of the tractor assembly 12.

The check valves avoid back feeding hydraulic pressure into the actuators when supplied by an alternate source of hydraulic pressure, such as through the port 86 when supplied with hydraulic pressure through the supply 68, valve 71, line 82, connector 84 into port 86 as would happen when the device is currently configured to operate with the laser automatic grading system. The check valves could also be located on the valves 71, 72 or 73 with similar results. One way check valves can also be on the other hydraulics 34, 36 and 38.

The valve assembly 69 includes the valves 71, 72 and 73 as well as the manifold 74. The manifold 74 connects both the hydraulic pressurized supply 68 and the hydraulic return 70. The return 70 and the supply 68 are connected to the auxiliary hydraulic interface 66 that is available on most machines to provide hydraulic power to any attachment, such as the dozer blade in the present configuration.

It should be appreciated that each of the hydraulic lines in the drawings, including lines 81, 82, 83, 87, 88, 91, 93, are complete hydraulic control lines in that they contain both a supply and a return conduit for normal hydraulic functioning.

Valve 73 is associated with solenoid 79 and controls the yaw hydraulic actuator 38 through hydraulic line 82. For some grading applications the driver of the vehicle maintains manual control of the yaw motion of the blade, demonstrated in also in FIGS. 5 and 6. This allows the driver to select whether to discharge the cut to the left or right of the vehicle during grading operations. The computer is not capable of effectively determining which side to discharge the graded soil. The solenoid 79 is directed into the tractor assembly in FIG. 9 without being directed from the interface 66 with the automatic controller.

Valve 72 is associated with solenoid 77 and controls the roll hydraulic actuator 36 through hydraulic line 81. The roll axis of movement in the blade caused by this actuator is demonstrated in FIGS. 3 and 4. solenoid 77 is connected to the interface 66 by cable 78. The solenoid 77 is controlled by the automatic grade control computer to open and close valve 72 to cause hydraulic pressure and return line 81 power the roll axis hydraulic actuator 36.

Both valve 71 controlling the height of the cut through raising the main arm 48 while in laser grading mode and through moving the pitch axis hydraulic 34 may be electrically controlled by the automatic grading computer through an electronic controller 64. The electronic controller 64 essentially allows the automatic grading computer to control the movements of the blade in automatic mode and also to be controlled manually by the operator when the operator manipulates the joystick control in the cab 14.

Without the electronic controller 64 the automatic grader computer, whether controlling by laser or GPS inputs, may conflict with manual inputs made by the driver when also under automatic control. The electronic controller allows the manual input of the operator to temporarily take precedent in controlling the dozer blade over the automatic control computer. When the input from the manual controls is released then the automatic computer then can regain complete control of the dozer blade. The electronic controller is described in complete detail in U.S. patent application Ser. No. 16/041,696 filed on 24 Jul. 2018 by the same inventor as the present disclosure.

The valve assembly 69 contains valve 71 with solenoid 75 that ultimately will be responsible for adjusting the grade height with either laser or GPS automatic grading configurations. Valve 71 is operably connected to hydraulic line 83 that terminates in a connector 84. The connector 84 can be attached to the port 86 to control the hydraulic actuator 32 to raise and lower the main arm 48 when the system is in the laser grader control mode. In the laser grade control mode the pitch axis hydraulic is locked from any movement keeping the dozer blade substantially vertical. The method of stabilizing the blade for laser grading is fully explained in issued U.S. Pat. No. 8,118,111.

While in the laser control mode the valve 92 may also be closed to prevent unwanted actuation of the hydraulic 34 by the native hydraulic pump through hydraulic line 93. The valve 92 can be opened to allow native normal hydraulic control as needed.

In some systems the term solenoid is interchangeable with the term servo. These terms are generally understood to mean an electronically controlled hydraulic valve used on a bulldozer or skid steer to control the pressurized hydraulics that actuate the various movements of the machine. Some systems describe these as proportional hydraulics run with solenoids or proportional hydraulic valves. When used with an automatic control system these are generally electronically controlled devices to control the hydraulic cylinders.

By connecting the main arm hydraulic 32 to the valve 71 powered by the auxiliary hydraulic supply 68 and return 70 the main arm 48 can be controlled to lift and lower while the laser grading computer is putting in raise and lower control signals without any solenoid and valve combination on the tractor assembly 12 itself. The only valve 71 and solenoid 75 that effectively control the main arm are a part of the valve assembly 69 that is affixed to the dozer blade assembly 30.

The native hydraulic pathway from the tractor assembly is bypassed and the main hydraulic 32 for the main arm lift is powered through the front attachment accessory port on the interface. One way valves on the hydraulic connections between the hydraulic 32, the line 88, between the hydraulic 32 and the native high pressure hydraulic source, the valve 71, the port 86 or other available location prevents the hydraulic pressure from the accessory interface 66 output through supply 68 and return 70, through the valve assembly 69 from back feeding into the native hydraulic system and prevents any hydraulic conflict.

Alternatively, when the GPS automatic grading system is employed the hydraulic supply and return line 88 to the hydraulic actuator 32 is disconnected from port 86 and is connected to the port 85 where the pitch hydraulic actuator 34 is fed though hydraulic line 87. The hydraulic 32 responsible for the main arm 48 is thus disconnected from the accessory interface 66.

Further, when in GPS mode the main arm 48 rests in a lowered position on the stop 28, described in more detail below, and does not move during the automatic grading process. The main arm 48 may rest under its own weight and may be locked by a lock 62 in the lowered position to avoid any movement that could disturb the computer controlled movements of the dozer blade through the dozer blade assembly 30 hydrualics 34, 36 and 38.

In the GPS grading mode, any automatic grader control computer electronic signals are sent to the solenoid 71 through cable 76. That solenoid 71 controls the hydraulic pressure flow through the valve 71, through the line 82, through connector 84, into port 85 and is delivered, both supply and return pressure, to the pitch hydraulic 34.

Figure 2:
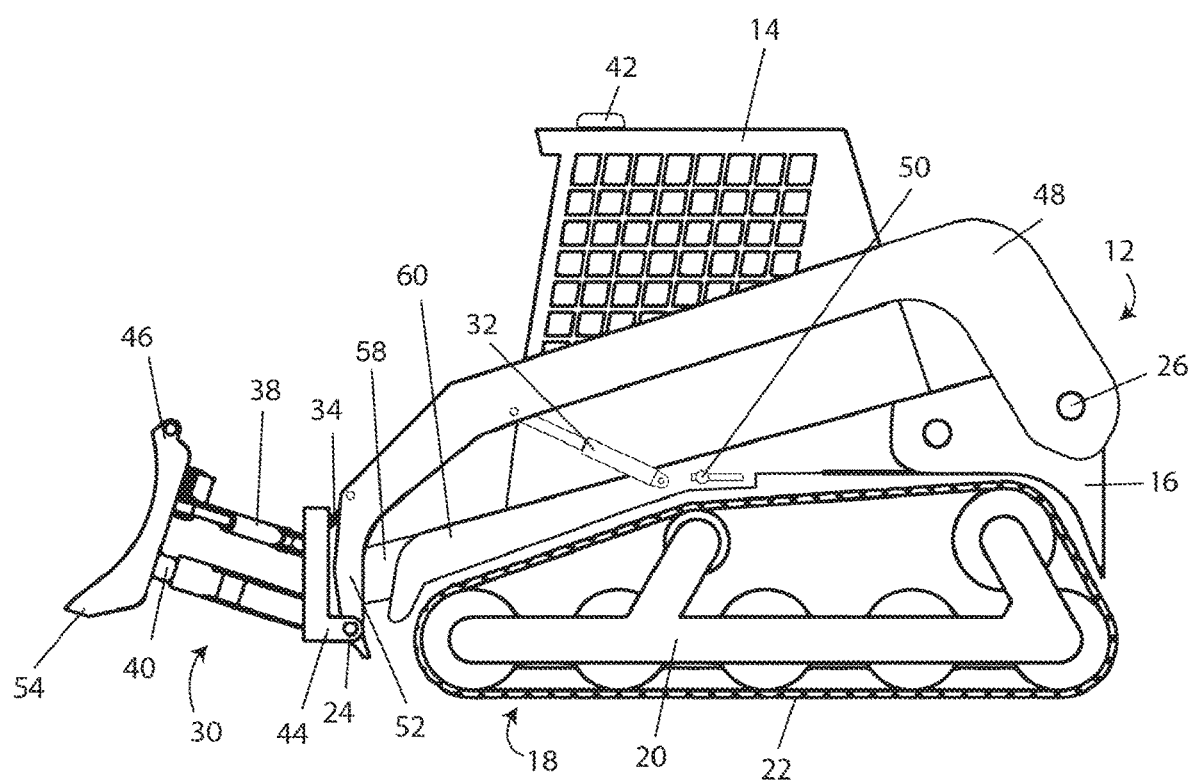
FIG. 2 is a side elevation view of a track steer vehicle with a dozer blade in an upper position.

In GPS mode the pitch hydraulic 34 pitches the balde 46 up as in FIG. 2 and down as in FIG. 1 while the main arm 48 is bottomed out on the stop 28. The entire up and down movement of the blade 46 is controlled on the dozer blade assembly 30 without any hydraulic actuators natively affixed to the tractor assembly 12.

The GPS grading computer is not directed to the hydraulic system native on the tractor assembly 12 that controls the hydraulic 32. Only when the tractor assembly 12 is reconfigured for laser type grading is the hydraulic power, through the interface 66, removed from the pitch hydraulc 34 and redirected to control the hydrualic 32 for the main arm. In this laser mode the now disconnected pitch hydraulic 34 is bottomed out and/or locked in place with bracketry.

The electrical controller 64 may be on dozer blade assembly 30, such as on or near the valve assembly 69. Alternatively the electronic controller could be on the tractor assembly 12 or near the interface 66, as shown in FIG. 9. The location of the electrical controller 64 may be anywhere that can interface and work with the valves 71 and 72 that control the lift/pitch and roll, respectively.

Referring again to the drawings in FIGS. 1-8, where the present invention with a GPS controller is generally referred to with numeral 10, it can be observed that it basically includes a tractor assembly 12, an operator cage 14, an engine case 16, a track assembly 18, a suspension 20, a track 22, a hinge 24, a hinge 26, a stop 28, a blade assembly 30, a hydraulic 32, a hydraulic 34, a hydraulic 36, a hydraulic 38, a frame 40, an antennae 42, a frame 44, a blade 46, a main arm 48, a valve 50, a front 52, a bottom 54, a bracket 56, a stop 58, a body 60 and a lock 62 and a leveler assembly 80.

Said tractor assembly 12 comprises, inter alia, an operator cage 14 and an engine case 16. An operator of the vehicle sits inside of and operates the vehicle from inside the operator cage 14. An engine inside the engine case 16 typically powers the vehicle including any hydraulics and an electrical system that powers the native on-board computer control system of the skid steer. Essentially the electronic controls of modern skid steer vehicles are fly-by-wire. Electrical inputs from a joystick are processed by the native computer and operate a system of solenoids, actuators, valves and other components to then control the hydraulic system that ultimately supplies the force to move the various elements of the skid steer and the operative attachments, such as a dozer blade assembly.

Said track assembly 18 comprises, inter alia, a suspension 20 and a track 22. In most applications a track steer vehicle will have complementary track assemblies 18 on both sides of the vehicle. The present system will work equally well on a wheeled vehicle and is not dependent on the form that the small earth moving vehicle embodies. However, a skid steer is commonly utilized with the present invention on many job sites and is well suited to move earth.

Said blade assembly 30 comprises, inter alia, a hydraulic 32, a hydraulic 36, a hydraulic 38, a frame 40, a bracket 42, a frame 44, a blade 46 and a main arm 48. The blade assembly 30 can generally be removed from the skid steer to use another attachment, as noted above.

Some users of the present system find it so indispensable that efforts are taken to permanently affix the blade assembly 30 to the skid steer and essentially make it a one purpose vehicle. Some of these adaptions use welding to affix the blade assembly to the front of the skid steer. The remaining axis of movements should be retained so that the automatic grade system keeps the full functionality with which it was designed to use.

FIG. 1 is an elevation view of a skid steer vehicle with a blade assembly 30 attached operatively to the front. Importantly, the front 52 of the main arm 48 is resting on the stop 28. This positions the main arm 48 in the lower most position. The main arm 48 cannot go lower because the stop 28 limits its downward movement.

The stop 28 is located on the body 60 of the skid steer or other location where the stop 28 is determined to intersect the front 52 or other part or bracket associated with the main arm 48 to limit its movement. Essentially the main arm 48 rests with the weight of the main arm 48 securely held by the stop 28.

The combination of stop 28 resting on the front 52 is merely enabling and exemplary of any combination where the main arm 48 bottoms out on a structure that supports the weight of the main arm 48 so that the main arm 48, and the blade assembly 30 affixed thereto so that the bottom 54 of the blade 46 is at a selected height relative to the level of the ground upon which the tracks 22 are supported.

As seen in FIGS. 1 and 2, when the main arm 48 is fully down the main arm 48 is against the stop 28 and locked against the stop with the lock 62. The lock 62 connects the main arm 48 (or an appendage thereto) against the body 60 (or appendage thereto) so that the main arm 48 is unable to move up or down. To further inhibit movement of the main arm 48, when the lock 62 is secure the valve 50 providing hydraulic pressure to the hydraulic 32 to move the arm is closed effectively stopping any movement of the main arm 48 by an additional means.

By having the valve 50 present the machine can easily be reconfigured with an alternate front attachment that utilizes the movement of the main arm 48, for example, a dump bucket, auger or any other attachment. When the other attachment is connected the valve 50 is simply opened and the lock 62 is removed and full functionality of the main arm 48 is restored.

With the valve 50 the user contemplates returning the skid steer to function with attachments other than only the dozer blade. In accord with this intent, the lock 62 is preferably also unlockable to free the movement of the main arm 48. The lock may therefore be comprised of a bracket like structure removably fixing the main arm 48 in position. Similarly, the lock 62 could manifest as a pinning system, bolting system or other similar means to connect the main arm 48 with the body 60 ans substantially preventing movement of the main arm 48 when the lock 62 is secured and the hydraulic 32 is rendered ineffective.

In some versions of the application of the inventive concept the valve 50 is not needed because the operator of the vehicle opts to dedicate the machine more fully to the GPS automatic grading. In this option, the hydraulic 32 is disconnected by capping the supply and or return hydraulic lines that feed hydraulic 32. This effectively stops any motive force affecting the raising and lowering the main arm 48 so the lock 62 secures the main arm 48 unopposed. With the hydraulic supply to hydraulic 32 removed there is no need for a valve 50.

In yet another variation that fully and essentially permanently dedicates the machine to GPS automatic grading the main arm 48 may be welded to the body or other structure of the vehicle to permanently lock the main arm 48 in place. The hydraulics 32 affecting the main arm 32 may be disabled or removed entirely. This option may be attractive to some users because it may be cheaper to install if the skid steer will never be used with the main arm 48 functional. In this version lock 62 would also be unnecessary because the weld would hold the main arm 48 in a secure position.

Referring now to FIG. 2 where the same vehicle is shown as in FIG. 1 but now shows the hydraulic 34 in a contracted configuration compared to the extended mode in FIG. 1. The difference between FIGS. 1 and 2 is exaggerated in these renderings to show that by changing the degree to which the hydraulic 34 is extended or retracted that the distance that the bottom 54 of the blade 46 lowers or raises relative to the plane of the ground defined by the bottom level of the tracks.

It is exactly this movement of the bottom 54 of the blade up and down that controls the depth of the cut of the blade as controlled by the automatic GPS grading computer. In the prior art the main arm had to lift the whole blade assembly 30 to move the bottom 54 up and down. Now, with the main arm 48 locked only the pitch up of the blade 46 affects how deep the blade 46 cuts the soil. The GPS computer controls this depth and thereby controls the grade that the machine levels the soil. Notice how the weight of the main arm 48 no longer is needed to move with the rest of the blade assembly 30 when the height of the bottom 54 is manipulated by the automatic grading computer.

As the hydraulic 34 picks up and lowers the blade 46 and its bottom 54 the entire blade assembly 30 is articulated about hinge 24. The roll and yaw movements described below are still maintained effective and can also be optionally controlled by the automatic grading computer system independent of the pitch axis of movement.

It should be appreciated that there are alternative configurations of equivalents of the blade assembly 30 than the illustration provided with this specification. In some, the entire blade assembly 30 may not lift and lower with the pitch hydraulic 34 because the pitch hydraulic 34 may be, for example, directly connected to the blade 46 so that fewer elements than the whole blade assembly 30 must be moved together. The inventive concept includes that the main arm 48 is not responsible for the lifting of the bottom 54 but instead is the hydraulic, functionally similar to hydraulic 34, that controls the pitch movement of the blade 46 that has the effect of altering the height of the bottom 54.

Now referring to FIGS. 3 and 4 where a front elevation view of a skid steer vehicle with a dozer blade attachment is shown. These views are to demonstrate the roll axis that the operator of the vehicle can move the blade. The roll axis is typically manipulated to produce an incline or sloped grade. The roll axis is controlled by hydraulic 36.

FIGS. 5 and 6 are a top plan view of a skid steer vehicle with a dozer blade attachment demonstrating the yaw axis that the operator of the vehicle can move the blade. The yaw axis is typically changed to push soil to one side of the skid steer vehicle. The change in yaw can be helpful in moving soil as part of the grading process. The yaw axis is controlled by hydraulics 38.

Figure 7:
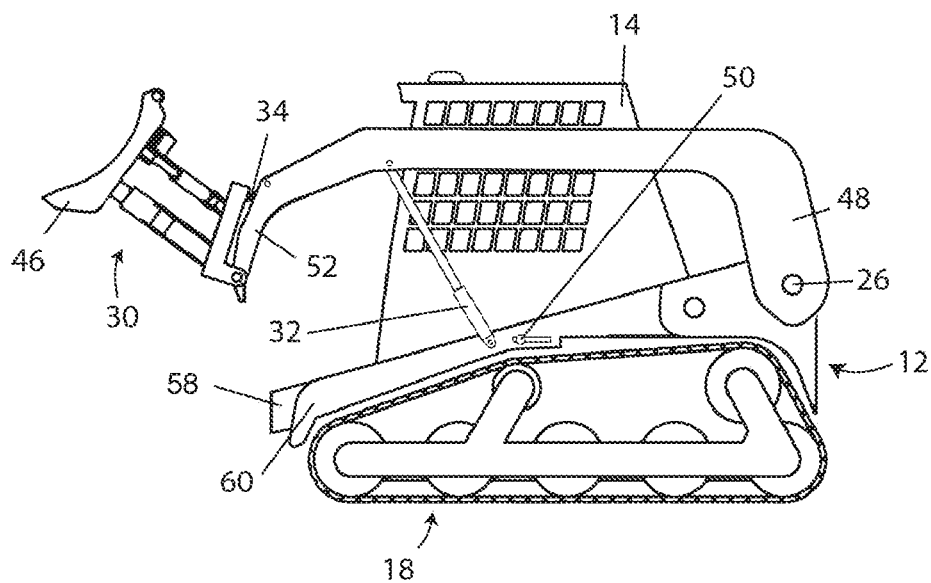
FIG. 7 is a side elevation view demonstrating a raised main arm.

FIG. 7 shows an example of the main arm 48 in a lifted configuration by extending the hydraulic 32. In this configuration the lock 62 is unlocked and the valve 50 is open allowing normal operation of the main arm 48 as the machine was intended from the manufacturer. FIG. 7 is not configured in accord with the present inventive concept while functioning to automatic grade. This figure merely demonstrates the capability of the machine when the present method of stabilizing the automatic grading system is not employed. In at least some versions of the invention the machine can easily be reconfigured to work as in FIG. 7 as might be needed for purposes other than GPS automatic grading while the valve 50 is open and the hydraulic 32 is active and the lock 62 is not securing the main arm 48.

Figure 8:
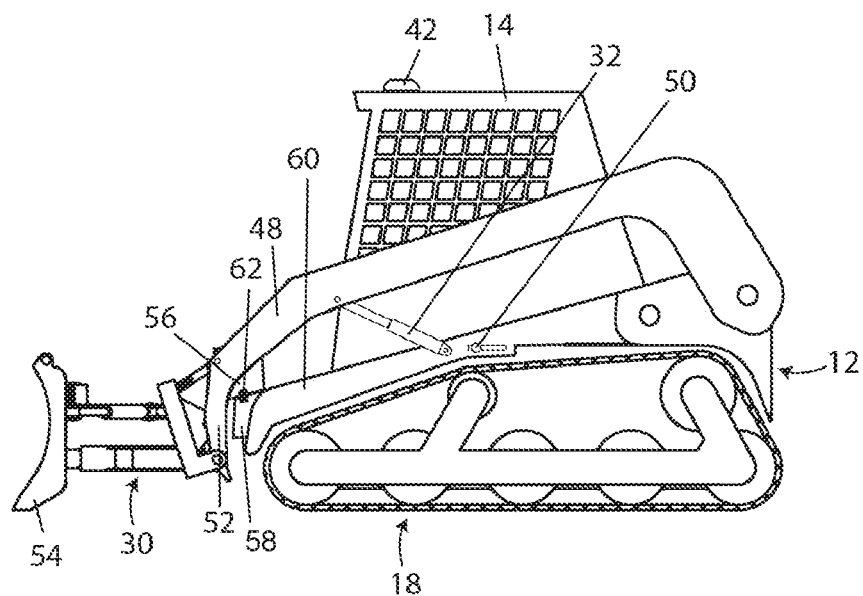
FIG. 8 is a side elevation view demonstrating lowered main arm and an example of a bracket upon which the main arm rests.

FIG. 8 is a side elevation view of a skid steer vehicle with a dozer blade attachment demonstrating an alternate but equivalent means to secure the main arm 48 in a stable position. As discussed above, the hydraulic 32 is disabled by closing valve 50 or by the other hydraulic limiting means. In this version there is a bracket 56 affixed to the main arm 48 or other structure appurtenant thereto that interfaces with a stop 58 associated with the body 60 or other structural part of the vehicle. The combination of bracket 56 and stop 58 define a specific position that the main arm 48 is held at during the GPS automatic grading operations.

The use of the bracket 56 and stop 58 allow any brand, shape or configuration of skid steer to have a means to hold the main arm 48 at the required position to in turn hold the blade assembly 30 at the right height so that only the pitch axis of movement of the blade 46 affects how deep the blade 46 cuts and the automatic grading computer can effectively cut throughout the range of blade height needed.

The bracket 56 and stop 58 may be bolted or welded on the measured position of the machine and its main arm 48 so that the bottomed out main arm 48 is held at the right height. This may vary from make of machine to different models of the same make. A lock 62 is also optionally provided to secure the main arm 48 in place during automatic grading operations similar to the lock on other embodiments as disclosed in the examples given above.

Also similar to other versions above, the bracket 56 and stop 62 may be a plate, bracket or other structure securing more permanently the main arm 48 to the structure of the vehicle. Likewise the valve 50 could be traded for other means to prevent activation of the hydraulic 32 in addition to the bracket 56 and stop 58.

One commonly skilled in the art will appreciate a small to medium skid steer vehicle as contrasted to a larger dedicated purpose earthmoving vehicle such as a bulldozer.

One commonly skilled in the art will appreciate a small to medium skid steer vehicle may have either ground contacting tracks or wheels. In most environments a track style small to medium skid steer vehicle is preferred for its stability, traction and resistance to sinking in softer soils or creating ruts.

It should be appreciated that the inventive concepts can be maintained by including some or all parts from different variations of the embodiments described herein. The drawings are not intended to be specifically limiting to a single configuration giving rise to the inventive concept but are instead stylized illustrations of the important functions and features that may be encompassed in the greater inventive intent as apparent by this disclosure.

Native hydraulics generally mean on board pump and control system provided by the manufacturer of the bulldozer or skid steer. In most machines there is a hydraulic pump and reservoir included to provide hydraulic supply and return to run a variety of accessories on and attached to the machine.

Figure 10:
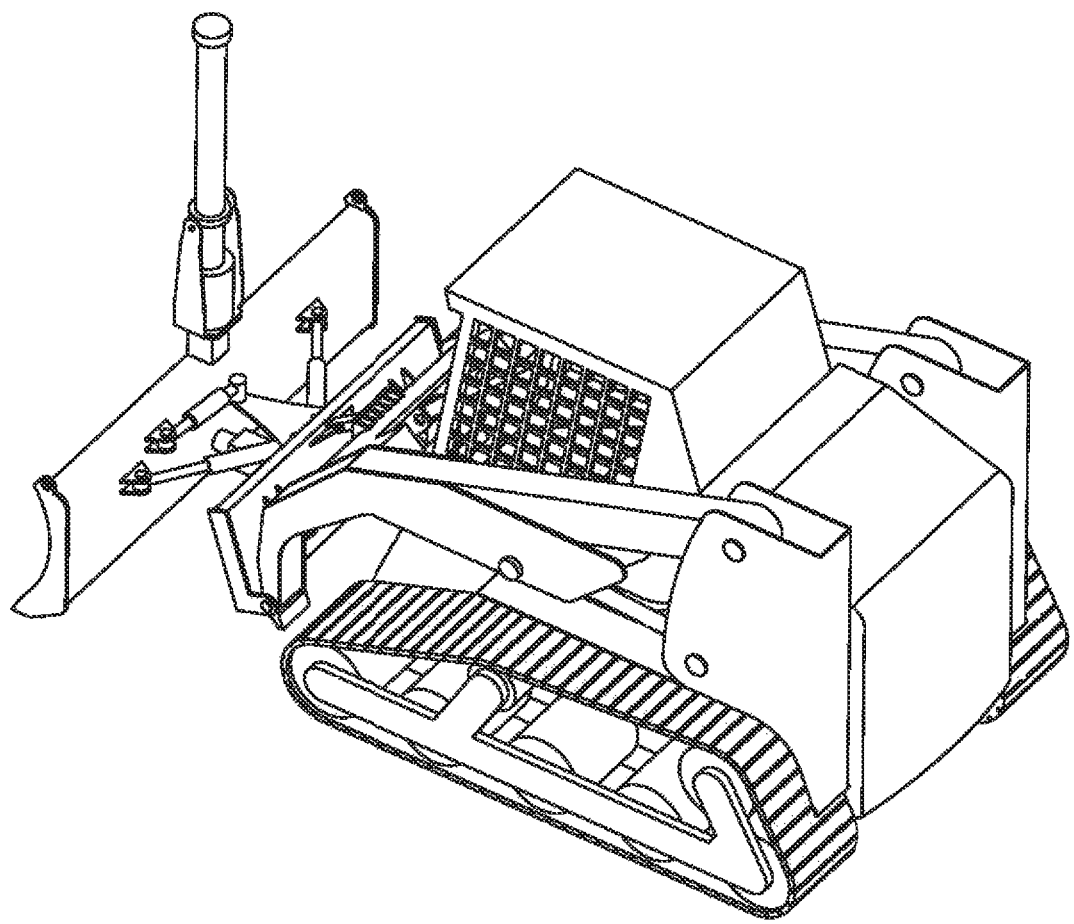
FIG. 10 is a perspective view of a dozer blade front attachment with a laser grading mast employed with an automatic grade control system.

The term automatic grader control system includes the computer and parts to make the computer able to control the system. These include a laser receiver and mast as seen in FIG. 10 or GPS based systems. These systems work with the on board or native controls provided originally with most vehicles.

A version of the invention can be fairly described as a process for using a dozer blade attachment with a bulldozer comprising, among other features an automatic grader control system and the dozer blade attachment. The dozer blade attachment is connected to a main arm on the bulldozer. The dozer blade attachment has a pitch hydraulic and a roll hydraulic to control those movements of the dozer blade. The bulldozer has a native hydraulic system from the factory that powers aspects of the vehicle and is operatively connected to a main arm lift hydraulic that operates the main arm. The native hydraulic system is operatively connected to the pitch hydraulic. The pitch hydraulic is also operatively connected to a first hydraulic line or connector. The main arm lift hydraulic is also operatively connected to a second hydraulic line or connector. A valve assembly may be affixed to the dozer blade attachment or nearby the dozer blade attachment and is separate from the native hydraulic controllers. The valve assembly comprises a manifold operatively connected to a first hydraulic valve and a second hydraulic valve. The manifold is operatively connected to the accessory hydraulic system providing a hydraulic supply and return. The accessory hydraulic system is generally provide to connect the native hydraulic system to any of a variety of attachments, such as a dozer blade attachment but has never previously been connected to the main arm hydraulic which has always previously been powered by the native hydraulic system. The first and second hydraulic valves are operatively controlled by the automatic grader control system. Automatically controlling the roll hydraulic of the dozer blade attachment with the first hydraulic valve with the automatic grader control system. Selectively connecting the second hydraulic valve only one at a time to either the second hydraulic line or the first hydraulic line. Connecting only one at a time either a laser controller or a GPS controller to the automatic grader control system. If connecting the laser controller to the automatic grader control system then: connecting the second hydraulic valve only to the second hydraulic line to control the main arm lift hydraulic through the second hydraulic valve and closing a third valve between the native hydraulic system and the pitch hydraulic and restraining movement of the pitch hydraulic. Or, if connecting the GPS controller to the automatic grader control system then: connecting the second hydraulic valve only to the first hydraulic line to control the pitch hydraulic through the second hydraulic valve and closing a fourth valve between the native hydraulic system and the main arm lift hydraulic and resting the main arm in a lowered position on a support.

Another important version of the invention can be fairly described as a dozer blade control system comprised of a vehicle with a dozer blade attachment and an automatic grader control system. The vehicle has a native hydraulic system providing a hydraulic supply and return to a manifold assembly through an accessory hydraulic system. The manifold assembly is affixed to the dozer blade attachment. The manifold assembly comprises of a first hydraulic valve operated by a first solenoid and a second hydraulic valve operated by a second solenoid. The first hydraulic valve is operatively connected to a roll axis hydraulic of the dozer blade attachment and is controlled by the automatic grader control system. The second hydraulic valve is operatively connected to only one at time either a pitch axis hydraulic when the automatic grader control system uses a GPS controller or a main lift arm hydraulic when the automatic grader control system uses a laser controller. A third valve disconnects the main lift arm hydraulic directly from the native hydraulic system only when the second hydraulic valve is connected to the pitch axis hydraulic. A fourth valve disconnects the pitch axis hydraulic directly from the native hydraulic system only when the second hydraulic valve is connected to the main arm hydraulic. The automatic grader control system controls the second hydraulic valve to raise and lower a dozer blade attached to the dozer blade attachment by controlling only the main arm hydraulic when the laser controller is used or by controlling only the pitch axis hydraulic when the GPS controller is used.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A process for using a dozer blade attachment with a bulldozer comprising an automatic grader control system and the dozer blade attachment;
   the dozer blade attachment is connected to a main arm on the bulldozer;
   the dozer blade attachment has a pitch hydraulic and a roll hydraulic;
   the bulldozer has a native hydraulic system operatively connected to a main arm lift hydraulic that operates the main arm;
   the native hydraulic system is operatively connected to the pitch hydraulic;
   the pitch hydraulic is also operatively connected to a first hydraulic line;
   the main arm lift hydraulic is also operatively connected to a second hydraulic line;
   a valve assembly is affixed to the dozer blade attachment;
   the valve assembly comprises a manifold operatively connected to a first hydraulic valve and a second hydraulic valve;
   the manifold is operatively connected to the accessory hydraulic system providing a hydraulic supply and return;
   the first and second hydraulic valves are operatively controlled by the automatic grader control system;
   automatically controlling the roll hydraulic of the dozer blade attachment with the first hydraulic valve with the automatic grader control system;
   selectively connecting the second hydraulic valve only one at a time to either the second hydraulic line or the first hydraulic line;
   connecting only one at a time either a laser controller or a Global Positioning System (GPS) controller to the automatic grader control system; and
   if connecting the laser controller to the automatic grader control system then:
   connecting the second hydraulic valve only to the second hydraulic line to control the main arm lift hydraulic through the second hydraulic valve and closing a third valve between the native hydraulic system and the pitch hydraulic and restraining movement of the pitch hydraulic;
   or,
   if connecting the GPS controller to the automatic grader control system then: connecting the second hydraulic valve only to the first hydraulic line to control the pitch hydraulic through the second hydraulic valve and closing a fourth valve between the native hydraulic system and the main arm lift hydraulic and resting the main arm in a lowered position on a support.

2. A dozer blade control system comprised of a vehicle with a dozer blade attachment and an automatic grader control system;
   the vehicle has a native hydraulic system providing a hydraulic supply and return to a manifold assembly through an accessory hydraulic system;
   the manifold assembly is affixed to the dozer blade attachment;
   the manifold assembly comprises of a first hydraulic valve operated by a first solenoid and a second hydraulic valve operated by a second solenoid;
   the first hydraulic valve is operatively connected to a roll axis hydraulic of the dozer blade attachment and is controlled by the automatic grader control system;
   the second hydraulic valve is operatively connected to only one at time either a pitch axis hydraulic when the automatic grader control system uses a GPS controller or a main lift arm hydraulic when the automatic grader control system uses a laser controller;
   a third valve disconnects the main lift arm hydraulic directly from the native hydraulic system only when the second hydraulic valve is connected to the pitch axis hydraulic;
   a fourth valve disconnects the pitch axis hydraulic directly from the native hydraulic system only when the second hydraulic valve is connected to the main arm hydraulic;
   the automatic grader control system controls the second hydraulic valve to raise and lower a dozer blade attached to the dozer blade attachment by controlling only the main arm hydraulic when the laser controller is used or by controlling only the pitch axis hydraulic when the GPS controller is used.

* * * * *